United States Patent [19]
Meyer et al.

[11] 3,805,136
[45] Apr. 16, 1974

[54] ELECTRIC HAIR CLIPPER WITH PERMANENT MAGNET MOTOR

[75] Inventors: Roy E. Meyer; John F. Wahl; William M. Walton, all of Sterling, Ill.

[73] Assignee: Wahl Clipper Corporation, Sterling, Ill.

[22] Filed: Aug. 2, 1972

[21] Appl. No.: 277,299

Related U.S. Application Data

[63] Continuation of Ser. No. 94,903, Dec. 3, 1970, abandoned.

[52] U.S. Cl. .................. 318/331, 318/345, 310/50
[51] Int. Cl. .............................................. H02p 5/16
[58] Field of Search ...... 310/50, 154; 318/331, 345, 318/332

[56] References Cited
UNITED STATES PATENTS

| | | | |
|---|---|---|---|
| 3,502,915 | 3/1970 | Moret | 310/50 |
| 3,550,280 | 12/1970 | Palm | 310/50 |
| 3,678,360 | 7/1972 | Minarik | 318/332 |
| 3,221,234 | 11/1965 | Ault | 318/331 |
| 3,518,520 | 6/1970 | Molnar | 318/331 |
| 3,648,142 | 3/1972 | Corey | 310/50 |
| 3,469,129 | 9/1969 | Humphreys | 310/154 |

*Primary Examiner*—Bernard A. Gilheany
*Assistant Examiner*—Thomas Langer
*Attorney, Agent, or Firm*—Edward U. Dithmar

[57] ABSTRACT

An electric hair clipper of the rotary motor type possessing superior cutting power and having a casing of relatively small transverse dimensions for enhanced visibility of the cutting blades and comfortable handling during use. The size and shape of the drive motor establish the dimensions of the casing, the motor having small transverse dimensions in relation to its power capacity. The motor, which has a permanent magnet field and is energized by direct current, may be single speed, two speed, or continuously variable in speed over a wide range, each version having a stall torque comparable to that of a motor of larger size, or a motor designed for a higher no-load speed. The motor has a power supply energized by commercial alternating current power, the power supply including a rectifying means having an output means providing power to the motor in an amount depending on the mechanical load encountered by the motor. As the motor tends to slow down due to load, more power is supplied. In one form, the output means includes a Zener diode, in another a Zener diode and shunting switch, in yet another a silicon controlled rectifier circuit, and in another a silicon controlled rectifier circuit with an adjusting means. The field structure of the motor includes a permanent magnet means wherein the ratio of field structure length to field structure diameter (L/D) exceeds 1.25 with the field structure diameter less than about 1¼ inches, providing a motor of small transverse dimensions. In more detailed aspect, the field structure provides a skewed magnetic field, enhancing smoothness of motor operation, and, due to the reduced size of the motor, the axis of the motor shaft intersects the movable clipper blade adjacent the cutting teeth, permitting use of an inexpensive transmission of the cam type.

3 Claims, 6 Drawing Figures

PATENTED APR 16 1974 3,805,136

Inventors
ROY E. MEYER
JOHN F. WAHL
BY WILLIAM M. WALTON
Prangley, Clayton,
Mullin, Dithmar & Vogel. ATTYS.

PATENTED APR 16 1974 3,805,136

ELECTRIC HAIR CLIPPER WITH PERMANENT MAGNET MOTOR

This is a continuation of application Ser. No. 94,903, now abandoned, filed Dec. 3, 1970.

BACKGROUND OF THE INVENTION

This invention relates to electric hair clippers, and more particularly to an electric hair clipper of the rotary motor type possessing superior cutting power and having a casing of relatively small transverse dimensions for enhanced visibility of the cutting blades and comfortable handling during use.

Prior hair clippers of the rotary motor type tend to be bulky due to the physical size of the motors which must be used in order to provide the necessary cutting power. Motors of adequate power used in such clippers have relatively large transverse dimensions, meaning that the casing enclosing the motor has a size and shape which obscure the cutting blades during use of the clipper. Further, such a casing is uncomfortable and tiring to handle.

Rotary motor clippers in the prior art have involved a compromise between cutting power and desirable size for blade visibility and handling comfort, and no one of these conditions has been completely satisfied.

The invention contemplates an electric hair clipper of the rotary motor type wherein the motor has a permanent magnet field and is energized by direct current. The motor has a power supply to which is applied commercial alternating current power, the power supply having a rectifier with an output means providing power to the motor in an amount depending on the mechanical load encountered by the motor in use. Thus, as the motor tends to slow down due to load, more power is supplied.

In addition to the foregoing, the invention contemplates an electric hair clipper of the rotary motor type wherein the motor may be single speed, two speed, or continuously variable in speed over a wide range, each version having a stall torque comparable to that of a motor of larger size, or a motor designed for a higher no-load speed than is used in the invention.

SUMMARY OF THE INVENTION

The invention involves an electric hair clipper of the rotary motor type which has superior cutting power as well as a casing of relatively small transverse dimensions for enhanced visibility of the cutting teeth and comfortable handling during use.

The rotary motor, which makes the foregoing possible, has a permanent magnet field and is energized by direct current. This motor is designed for a no-load speed considerably in excess of the no-load speed permitted by an associated power supply which is energized by commercial alternating current power. By way of example, a clipper motor embodying the invention may have a designed no-load speed of 6,000 R.P.M. when energized by rectified power derived from a conventional bridge rectifier, and a no-load speed of 5,000 R.P.M. or lower when energized by the associated power supply of the invention.

A starting point for the design of a motor according to the present invention is the size of the permanent magnet field structure. This structure, which is cylindrical, has a diameter less than about 1¼ inches, and a ratio of length to diameter (L/D) in excess of 1.25. The size of this field structure establishes the transverse dimensions of the motor, and insures that the motor has small transverse dimensions in relation to length so that the casing which snugly receives the motor has relatively small thickness and the motor has requisite power.

In the illustrated preferred form of the invention the permanent magnet field structure includes a cylindrical shell of magnetic material which houses two similarly magnetized cylindrical members mounted colinearly therein. The field orientations of the two magnetized members differ by an angle in the range of 5°–15° to provide a skewed magnetic field, enhancing smoothness of motor operation.

A wire wound armature is disposed within the aforesaid permanent magnet field structure, the armature including a stack of laminations having a length in the illustrated preferred form of substantially 1¼ inches and a diameter of substantially three-fourths inch. This armature is wound with a large number of turns of fine wire, the wire size and number of turns being appropriate, for example, for a designed no-load speed of about 6,000 R.P.M. when energized by a conventional bridge rectifier. The motor, of course, has a predetermined stall torque of magnitude proportional to the designed no-load speed.

This motor has a power supply connected to a commercial alternating current power source, the power supply including a rectifying means having an output means providing suitable power to operate the motor at a no-load speed substantially lower than the designed no-load speed, such reduced no-load speed being at least 15 percent below the designed no-load speed. The output means of the power supply functions to provide increased power to the motor in response to an increase in mechanical load on the motor. Thus, as the motor tends to slow down due to load encountered in cutting hair, more power is supplied. The aforesaid power supply causes the motor to operate at a no-load speed or speeds substantially below the designed no-load speed with no significant reduction in the predetermined stall torque.

As previously mentioned, the power supply may be such that the motor may be single speed, two speed or continuously variable in speed over a wide range, each version having a stall torque comparable to that of a motor of larger size, or a motor designed for a higher no-load speed. The rectifying means of the power supply has an output means which applies power to the motor in an amount depending on the mechanical load encountered by the motor. In one form, the output means includes a Zener diode (for single speed), in another form a Zener diode and shunting switch (for two speed), in yet another form a silicon controlled rectifier circuit (for single speed), and in another form a silicon controlled rectifier circuit with an adjusting means (for continuously variable speed).

In more detailed aspect, the clipper embodying the invention has a sealing wall within the casing which separates the motor compartment from a compartment containing a transmission mechanism extending between the motor shaft and the movable cutting blade of the clipper. The motor shaft extends in sealing manner through an aperture in this wall, preventing hair, etc. from entering the motor compartment. Due to the small size of the motor, the axis of the motor shaft intersects the movable blade adjacent the cutting teeth, a feature which permits use in the clipper of an inexpensive transmission of the cam type.

Other objects, advantages and details of the invention will be apparent as the description proceeds, reference being had to the accompanying drawings wherein preferred forms of the invention are shown. It will be understood, however, that the description and drawings are illustrative only, and that the scope of the invention is to be measured by the appended claims.

DESCRIPTION OF THE PREFERRED EMBODIMENTS

Figure 1:
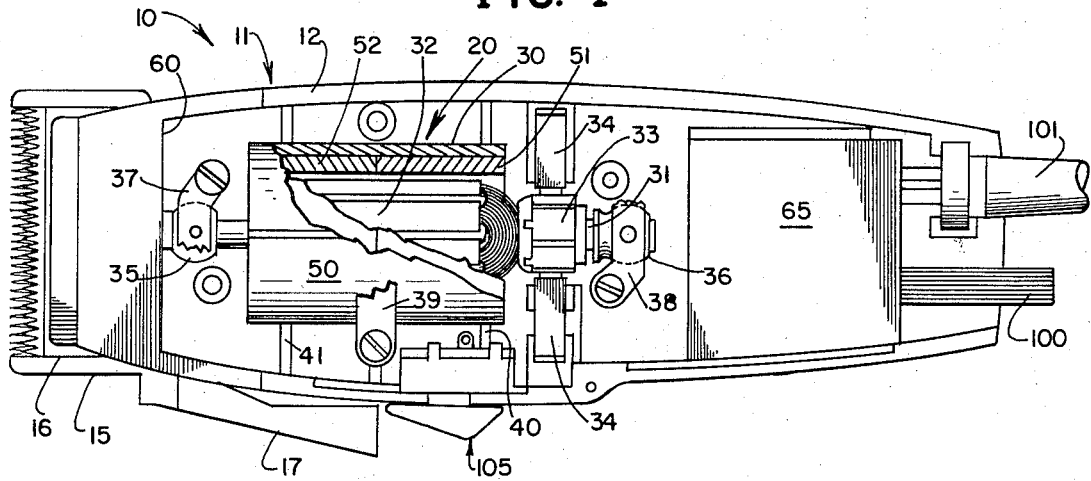
FIG. 1 is a top plan view, partly broken away and partly in section, of an electric hair clipper embodying the invention, the lid of the clipper casing being removed for clarity.
Figure 2:
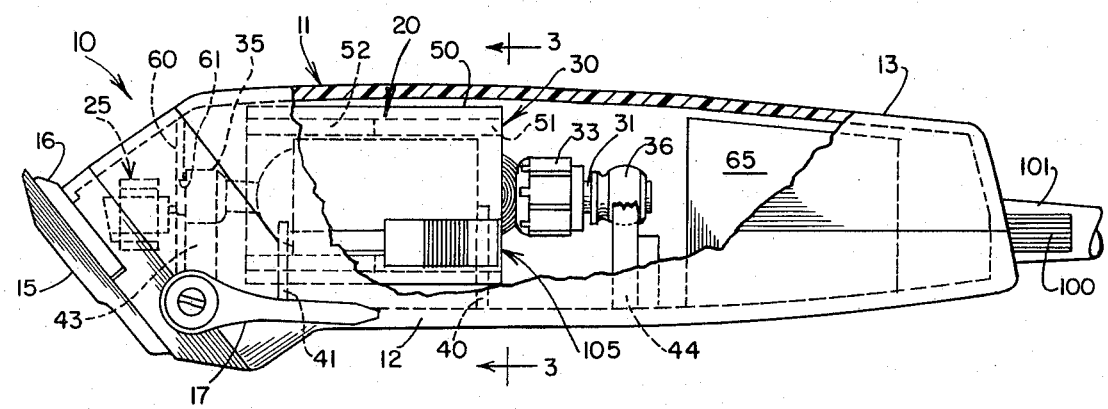
FIG. 2 is a side elevational view, partly broken away, of the clipper shown in FIG. 1.
Figure 3:
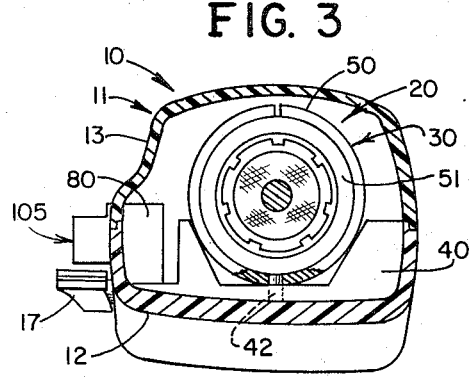
FIG. 3 is a transverse sectional view on line 3—3 of FIG. 2.

Referring first to FIGS. 1-3, an electric hair clipper embodying the invention is generally designated 10. Clipper 10 has a casing 11 consisting of a lower casing part 12 and an upper casing part 13 (FIG. 2).

A stationary comb blade 15 is mounted on the forward end of lower casing part 12 in inclined relation with the axis of the casing, and a movable cutting blade 16 is mounted on comb blade 15 in effective cutting relation therewith. Guide means (not shown) fixes the travel path of cutting blade 16. The forward end portions of the blades 15 and 16 are provided with conventional cutting teeth, as shown in FIG. 1, the teeth overlapping each other in an amount established by the position of lever 17 which provides adjustment for length of cut.

A motor generally designated 20 is mounted on lower casing part 12, and is snugly embraced top and bottom by casing parts 13 and 12, respectively. Details of motor 20 will be described later.

A transmission mechanism generally designated 25 is shown in broken line in FIG. 2. This mechanism per se is not part of the present invention, but is illustrated in FIG. 2 for completeness.

Motor 20, which is energized by direct current, has a permanent magnet field structure 30, a motor shaft 31, a wound armature 32 and commutator 33 on shaft 31, and brushes 34 carried by lower casing part 12.

Motor shaft 31 has a front bearing 35 and a rear bearing 36, the two bearings respectively held in lower casing part 12 by straps 37 and 38 (FIG. 1). Field structure 30 is secured to lower casing part 12 by strap 39, the three straps 37, 38 and 39 being secured to bosses on the lower casing part.

Field structure 30 is cradled in rear and front bosses 40 and 41 on lower casing part 12, the rear cradling boss 40 being best shown in FIG. 3 together with an adjacent boss 42 which enters a recess in field structure 30 to orient the field structure in casing 11. As best shown in FIG. 2, front and rear motor shaft bearings 35 and 36 are supported on bosses 43 and 44 on lower casing part 12.

Field structure 30 of motor 20 comprises a longitudinally split cylindrical shell 50 of magnetic material, and magnetized field members mounted frictionally within the shell. As shown, there are two similarly magnetized cylindrical field members 51 and 52 mounted colinearly in shell 50. The two members are mounted with field orientations differing by an angle in the range of 5°–15° in order to provide a skewed magnetic field which enhances smoothness of motor operation.

The diameter of field structure 30 in the motor of the illustrated clipper is less than about 1¼ inches, and the ratio of field structure length to field structure diameter (L/D) exceeds 1.25. These parameters provide a motor of sufficiently small transverse dimensions as to be usable in an electric hair clipper without compromise as to blade visibility, handling comfort, or cutting power.

Figure 4:
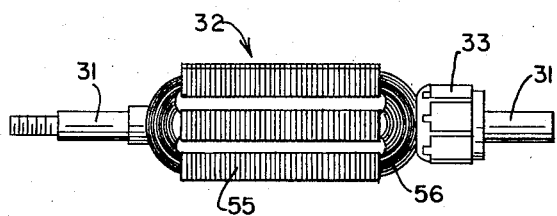
FIG. 4 is a slightly enlarged elevational view of the motor shaft and armature used in the invention.

Referring to FIG. 4, motor shaft 31 carries the aforesaid armature 32 which as illustrated is formed of a stack of seven-slot laminations 55 and associated windings 56. In the illustrated armature the lamination stack has a length of substantially 1¼ inches and a diameter of substantially three-fourths inch. Each winding, by way of example, comprises about 450 turns of No. 41 copper wire.

As best shown in FIG. 2, the forward end of lower casing part 12 has a generally vertical wall 60 which separates a compartment for motor 20 from a compartment for transmission mechanism 25. Wall 60 has a single aperture 61 through which motor shaft 30 extends in sealing manner into engagement with the transmission mechanism 25. Wall 60 effectively isolates the transmission and motor compartments, and prevents cut hair, etc. from entering the motor compartment.

As readily seen in FIG. 2, the axis of motor shaft 31 intersects movable cutting blade 16 between the transverse center line thereof and the forward edge of the blade which contains the cutting teeth. This relationship makes it possible to employ a transmission mechanism of the inexpensive cam drive type.

Figure 5:
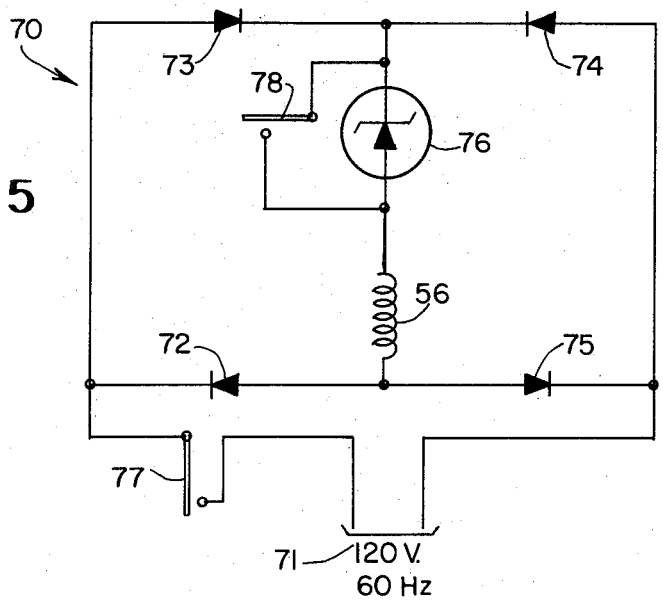
FIG. 5 is a schematic circuit diagram of one form of power supply usable in the invention.
Figure 6:
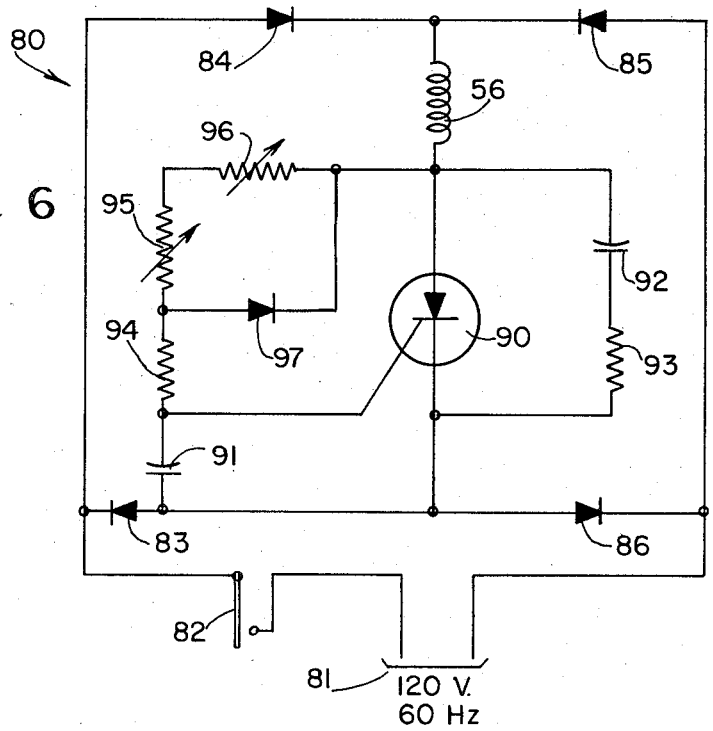
FIG. 6 is a schematic circuit diagram of another form of power supply usable in the invention.

A power supply 65 contained within casing 11 is shown in block form in FIGS. 1 and 2, and in schematic circuit diagram in FIGS. 5 and 6. The latter two figures illustrate two forms of power supplies usable in the invention.

Referring to FIG. 5, power supply 70, which is energized from a commercial alternating current power source 71, includes a conventional full-wave or bridge rectifying means having diodes 72, 73, 74 and 75, and an output means comprising a Zener diode 76 connected in series with motor armature windings 56. An off-on switch 77 is connected between the power source and the rectifier.

A second switch 78 is connected in shunt with Zener diode 76, this switch being provided when two-speed motor operation is desired. If the motor is to have a single speed only, switch 78 is omitted.

Zener diode 76 in the output of the power supply functions to block a portion of the supply voltage, e.g. 30 volts, from the rectifier to motor 20, thereby dropping the no-load motor speed to the desired level, such reduced speed being at least 15 percent below the designed no-load speed. When the motor is subjected to an increase in mechanical load during use, the current supply through diode 76 is relatively unlimited, producing a highly desirable load vs. R.P.M. characteristic.

When two-speed operation is desired, switch 78 in shunt with diode 76 is used, and the second and higher speed achieved by closing the switch, thereby removing diode 76 from the circuit.

Power supply 70 (FIG. 5), when off-on switch 77 is closed and switch 78 is open, provides full-wave rectification of the alternating current from source 71, and applies positive potential pulsating direct current to the cathode of Zener diode 76. As mentioned, Zener diode 76 constitutes the output means of the power supply, the motor armature windings 56 being connected between the anode of the Zener diode and the negative side of the rectifying means.

With this arrangement, current flows through armature windings 56 on each one-half cycle of the pulsating direct current only when the direct current potential exceeds the rated avalanche breakdown potential (e.g. 30 volts) of Zener diode 76, thereby dropping the no-load motor speed to the desired operating level. When diode 76 conducts, the current is limited only by the motor impedance and the power rating of the diode.

It is to be noted that the voltage dropping effect of Zener diode 76 is significantly different from that of a similarly connected fixed resistor in that the voltage drop provided by the diode is relatively constant regardless of current flow, while the voltage drop across a fixed resistor increases with an increase in current flow. Any increase in voltage drop across a resistor, of course, would result in a lower voltage across the motor armature windings 56, and a corresponding objectionable reduction in motor speed and stall torque.

Referring to FIG. 6, alternative power supply 80 is energized from a commercial alternating current power source 81 which is connected through off-on switch 82 to a bridge rectifying means including diodes 83, 84, 85 and 86. The output means of the rectifying means includes a silicon controlled rectifier 90 and associated circuitry connected in series with armature windings 56. The associated circuitry includes capacitors 91 and 92, and resistors 93, 94, 95 and 96, the latter two of which are connected in series and shunted by diode 97. One of the resistors 95, 96, for example resistor 96, is a trimming potentiometer for making a factory adjustment which establishes a no-load speed at least 15 percent below the designed no-load speed of the motor.

In operation, silicon controlled rectifier 90 and associated output circuitry provide suitable power to operate the motor at the desired reduced no-load speed, and provide increased power in response to an increase in mechanical load on the motor, insuring that the stall torque at the lower speed is substantially the same as the predetermined stall torque at the unreduced designed no-load speed.

The motor speed may be made adjustable to provide any selected speed in the range of about 15 to 90 percent below the designed no-load speed with no significant reduction in predetermined stall torque by using an adjusting potentiometer for resistor 95. Such a potentiometer is used in power supply 65 shown in FIGS. 1 and 2, the control for such potentiometer being knurled shaft 100 protruding at the rear of the clipper adjacent power cord 101. Also, off-on switch 77 or 82 is shown at 105 in FIGS. 1 and 2.

Power supply 80 (FIG. 6), when off-on switch 82 is closed, provides full-wave rectification of the alternating current from source 81, and applies positive potential pulsating direct current to one terminal of motor armature windings 56. The output means of power supply 80, comprising silicon controlled rectifier 90 and associated adjusting means circuitry, is connected between the other terminal of the armature windings and the negative side of the rectifying means, the anode of the silicon controlled rectifier being connected to the armature winding and the cathode to the negative side.

Silicon controlled rectifier 90, of course, functions as a switch. When conducting, pulsating direct current flows through motor armature windings 56. The adjusting means circuitry associated with the silicon controlled rectifier 90 controls the switch action, as will be seen, and provides more or less current flow in the armature windings in response to mechanical load on the motor, as well as speed adjustment.

The silicon controlled rectifier 90, which becomes non-conducting when the anode to cathode voltage drops to near zero at the end of each one-half cycle of the pulsating direct current, becomes conducting after the start of each one-half cycle when triggered by a current pulse in gate lead 105. The time period of conduction determines the speed of the motor.

Gate lead 105 of silicon controlled rectifier 90 includes bi-lateral trigger diode 106 which may be an integral part of rectifier 90. Diode 106 presents a high impedance to the trigger current pulse until the voltage reaches the breakdown value for the diode. Thereafter, the diode has low impedance, and the current pulse therethrough causes silicon controlled rectifier 90 to conduct.

Capacitor 91 is connected between the positive and negative leads of the rectifying means through fixed resistor 94, potentiometers 95 and 96 and armature windings 56. Capacitor 91, fixed resistance 94 and potentiometers 95 and 96 form an RC circuit with an adjustable time constant controlled by potentiometers 95 and 96. The time constant determines how long it will take following the start of each one-half cycle for capacitor 91 to become charged to the breakdown voltage of trigger diode 106.

When capacitor 91 becomes charged to the breakdown voltage, trigger diode 106 switches to low impedance, and capacitor 91 supplies current to gate 105 of silicon controlled rectifier 90, whereby the latter becomes conducting.

During conduction of silicon controlled rectifier 90, current flows through armature windings 56. At the same time the remaining voltage across capacitor 91 is discharged through resistor 94, diode 97 and the silicon controlled rectifier 90. This discharge insures that capacitor 91 will be at the same low voltage level at the start of each charge cycle, a factor important for smooth motor operation.

One of the potentiometers, for example, potentiometer 96, is factory set to establish the high no-load speed of the motor at least 15 percent below the designed no-load speed. The adjustable element of this potentiometer preferably is not accessible to the user.

Accessible adjustment shaft 100 (FIGS. 1 and 2) of potentiometer 95 permits the user to adjust the motor speed over the pre-set range of about 15 to 90 percent below the designed no-load speed. Potentiometer 95 may have a resistance value higher than that needed to reach the desired minimum speed, and if so, rotation of shaft 100 is limited mechanically by an adjustable stop (not shown) which is factory set at the proper low speed. This feature enables each clipper to be set for desired minimum speed while employing a potentiometer of commercial tolerances.

Capacitor 92 and resistor 93 form an RC network across the anode and cathode of silicon controlled rectifier 90. This network enables the motor to operate at the lower speeds with more stability.

The voltage which charges capacitor 91 is dependent upon the rectified line voltage and the counter EMF of armature windings 56. Accordingly, the charging rate of capacitor 91 in part is dependent on motor speed. As the mechanical load on the motor increases, motor speed tends to decrease, reducing the counter EMF produced by armature windings 56. The reduced counter EMF enables capacitor 91 to charge faster and provide more power to the motor by causing silicon controlled rectifier 90 to conduct sooner in each one-half cycle.

Various elements of power supply 80 illustrated in FIG. 6 and described above may be modified, or regarded as optional, as will be understood. For example, factory set potentiometer 95 can be replaced by a fixed resistor which establishes the reduced maximum no-load speed of the motor. Also, adjusting potentiometer 95 can be replaced by one or more fixed resistors for providing one or more speeds, and resistor 94 can be eliminated, as the function thereof to limit the rate of discharge of capacitor 91 can be performed by remaining resistance in the circuit. Further, capacitor 92 and resistor 93 may be regarded as optional at the expense of low speed stability.

Many barbers when given the opportunity to use a variable speed clipper quickly find that certain clipping operations are best performed at higher motor speeds and other clipping operations are better performed at lower motor speeds. Generally speaking, rough clipping lends itself to the use of higher speeds, while fine clipping is accomplished better at lower speeds. The present invention when utilizing silicon controlled rectifier 90 and associated speed-adjusting potentiometer 95 gives the barber a clipper wherein the motor speed is adjustable over a wide range and wherein the stall torque at the various speeds is substantially uniform.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. In an electric hair clipper having a casing, a stationary comb blade on the forward end of said casing, and a movable cutting blade in effective relation with said comb blade, the improvements comprising:

an electric motor snugly contained within said casing, said motor energized by direct current and having a permanent magnet field structure wherein the ratio of field structure length to field structure diameter (L/D) exceeds 1.25 with the field structure diameter less than 1¼ inches so as to be relatively small, a motor shaft and a wound armature thereon, said motor designed for a predetermined no-load speed and a predetermined stall torque;

a gearless transmission mechanism between said motor shaft and said cutting blade; and a power supply for said motor contained within said casing, said power supply energized by commercial alternating current and including a full wave rectifying means and a control circuit means connected thereto and to said motor, said control circuit means including a silicon controlled rectifier and a factory-set adjusting means which provide suitable power to operate said motor at a maximum no-load speed at least 15 percent lower than said designed no-load speed, said control circuit means automatically providing increased power in response to an increase in mechanical load on said motor, whereby (1) the designed no-load speed of said motor is reduced to a maximum no-load speed of at least 15 percent below the designed no-load speed with no significant reduction in said stall torque, (2) the field structure which establishes the dimensions of said motor has relatively small diameter in relation to length and (3) the casing which snugly receives the motor has relatively small diameter, enhancing visibility of the blades and handling comfort during clipper operation.

2. The combination of claim 1 with the addition of a user-actuated adjusting means in said control circuit means for adjusting the no-load speed of said motor in the range of 15 to 90 percent below said designed no-load speed, whereby the power applied to said motor will control the no-load motor speed to provide any selected speed in the range of 15 to 90 percent below said designed no-load speed with no significant reduction in stall torque.

3. The combination of claim 1 wherein said wound armature includes a stack of laminations having a length of substantially 1¼ inches and a diameter of substantially three-fourths inch.

* * * * *